Mar. 5, 1929. A. O. ABBOTT, JR 1,703,919
MACHINE FOR USE IN THE MANUFACTURE OF TIRES
Filed Oct. 20, 1923 2 Sheets-Sheet 2

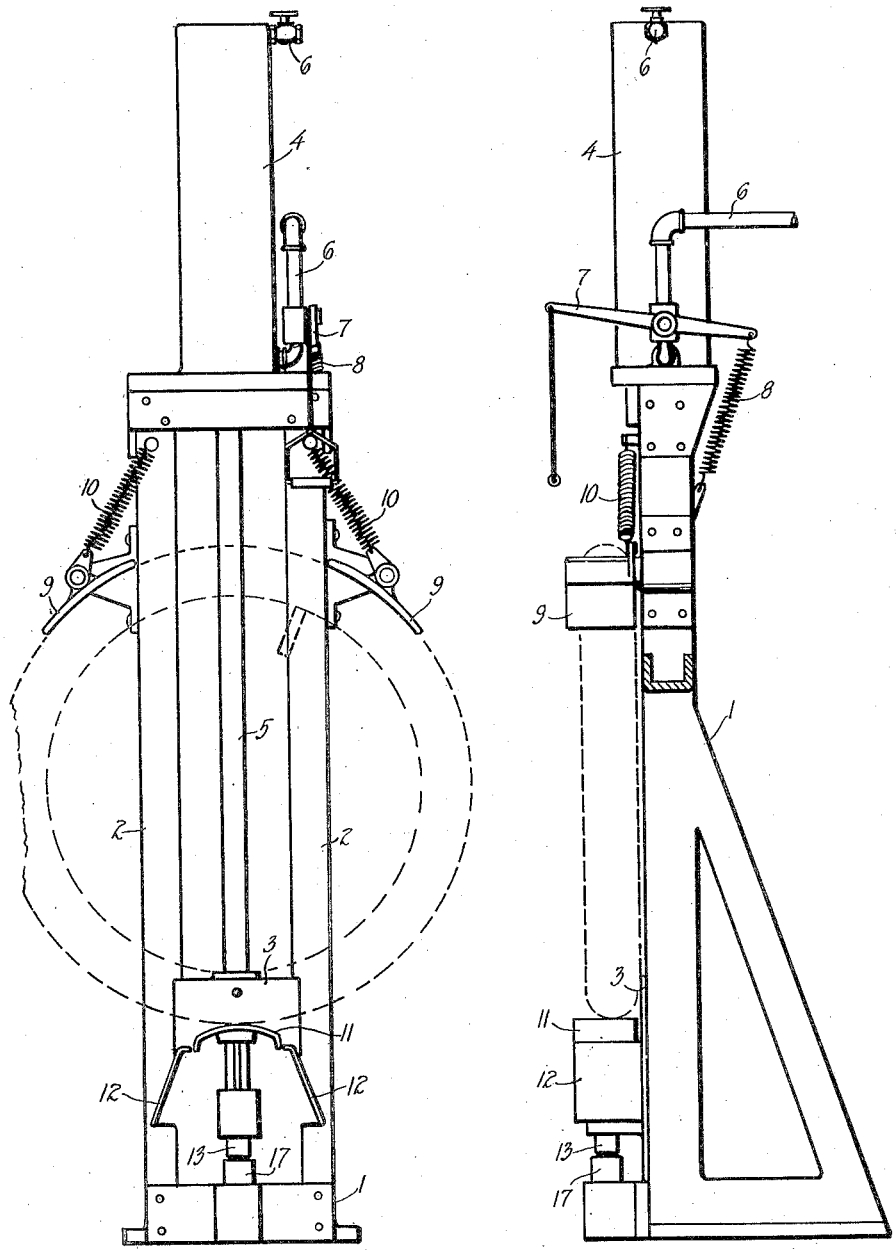

INVENTOR.
ADRIAN O. ABBOTT, JR.
BY
HIS ATTORNEY.

Patented Mar. 5, 1929.

1,703,919

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

MACHINE FOR USE IN THE MANUFACTURE OF TIRES.

Application filed October 20, 1923. Serial No. 669,751.

The invention relates more particularly to a machine for folding air or other pressure bags used in the manufacture of tires.

In the manufacture of tires by the more modern methods a fluid pressure bag ring-shaped and somewhat resembling an inner tube for tires is employed. While such bags may be employed at various stages in the manufacture of the tires, they are perhaps most commonly employed to support the tire interiorly during the vulcanizing process. Similar to an inner tube, the bag is adapted to be inflated by a fluid under pressure, usually compressed air, the fluid or the greater part of it being introduced after the bag has been inserted within the cavity of the tire. Considerable difficulty is experienced in inserting the bag within the tire due largely to the fact that the outer circumference of the bag is much greater than the inner circumference of the tire or tire cavity through which it must be inserted. This difficulty is most apparent in the modern type of bag which is relatively heavy, stiff and unyielding, being composed of a thick wall of rubber or other suitable material. To make it feasible to insert the bag in the tire the usual practice is to buckle a part of the bag to cause it to assume a fold. The bag thus temporarily deformed, folded or wrapped, may, with comparative ease, be inserted in the cavity of the tire. It requires considerable manual labor, however, to so shape the bag and it is the principal object of this invention to provide a machine for temporarily shaping the bag to adapt it to be inserted in the tire with a minimum amount of effort thereby relieving the workman of this difficult and laborious task.

Referring to the drawings showing a preferred embodiment of the invention,

Figure 1 is a front elevation of the machine;

Figure 2 is a side elevation;

Figure 3:
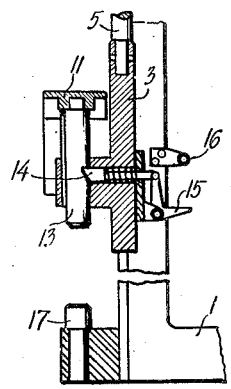
Figure 3 is a fragmentary section of Fig. 2.

In the embodiment of the invention shown in the drawings the machine comprises a frame 1 provided with guide bars 2—2 which slidably engage corresponding grooves in a cross head 3 whereby the head may be reciprocated. A fluid driven motor 4 is mounted on the frame in a position suitable to permit its connecting rod 5 to be secured to the cross head 3 as clearly shown in Figs. 1 and 3. The motor is provided in the usual way with feed and exhaust pipes 6, and a hand control lever 7, provided with a return spring 8, is further provided for operating the motor when it is desired to reciprocate the cross head 3.

As before stated it is essential that the bag be deformed by moving a portion of it temporarily away from the position that it will ultimately occupy in the tire so that the remaining portion of the bag may be easily inserted in its proper position in the bag. After this portion has been inserted the workman releases his hold on the deformed portion thereby permitting it to assume its proper position in the tire. It is obvious that the distortion may be produced in various ways and by various means which are within the scope of this invention, and the term "fold" and similar terms employed in the specification and claims are intended to include any distortion of the bag that will facilitate its insertion within the tire. Also the word "tire" is used in its broad sense and is intended to refer to any type of tire or tire casing in the manufacture of which a bag is used at some stage.

The invention considered broadly comprises a machine for temporarily deforming the bag. This necessitates that two parts of the bag be moved relatively. To accomplish this the workmen may be relied upon to support one of the parts of the bag that are relatively moved and the machine may be provided with instrumentalities to move the other part to produce the required relative movement to form the fold in the bag. This will relieve the workmen of much of the labor of preparing the bag for insertion in the tire. Or instead of the workmen supporting the bag as just described it may be mechanically supported requiring the workmen only to take the bag from the machine after it has been folded. While both of these ways come within the scope of the invention, in the preferred embodiment mechanical means is provided. As previously stated there may be various ways of distorting the bag, it is preferable however, to so move the opposite parts relatively that the fold will be formed without removing the parts from their original plane.

Figure 4:
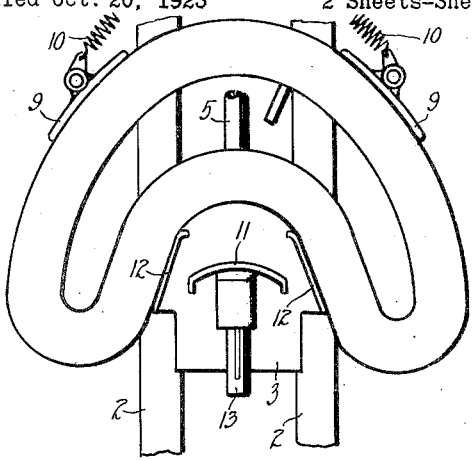
Figure 4 is a fragmental view of Fig. 1 after the machine has been operated to fold the bag in readiness to be removed.

The bag is folded in the present instance in this manner and means is provided for engaging the bag and other means for operating the engaging means whereby such a fold is produced. To this end a pair of shoes 9—9 is provided which is secured to the frame 1 to yieldingly pivot thereon by means of the springs 10. These shoes support the tire from one side and the opposite side is engaged by means attached to the head 3 and which comprise a central section 11 and two adjacent end sections 12—12. The section 11 is secured on a post 13 keyed to slide in an extension of the head 3. The post is provided with a notch which engages a spring pressed latch 14 secured at its outer end to a bell crank 15. A trip 16 is secured to the frame in the path of the free leg of bell crank 15 in a manner to strike this leg when the sections are being operated to fold the tire whereby the latch will be withdrawn from section 11 permitting same to drop as shown in Fig. 4. This leaves the central part of the folded portion free so that the workmen may easily grasp the bag when he removes it from the machine to place it in the tire. When the head is returned to its original position the post 13 strikes the abutment 17 secured at the foot of the frame 1. This arrests its movement and as the head 3 continues its movement the latch 14 is brought to register with the notch in the post 13 whereupon it snaps into place therein thereby locking the post and head together in their initial relation ready for the repetition of the folding operation.

Figure 5:
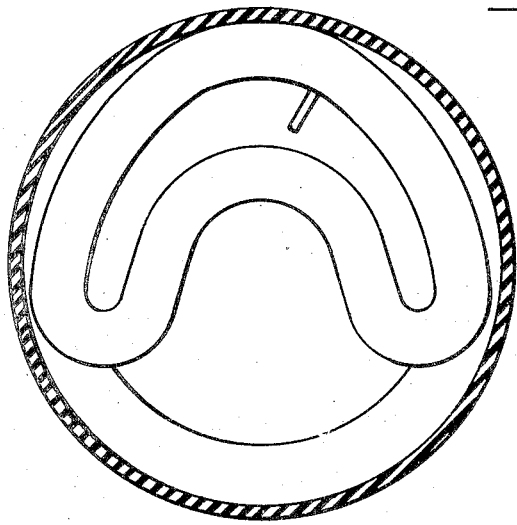
Figure 5 shows a tire in longitudinal section and a bag as it appears when first inserted in the tire.
Figure 6:
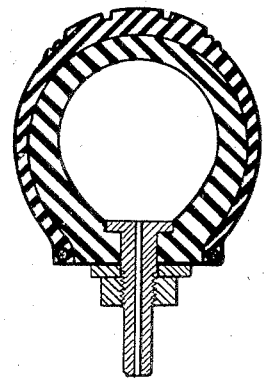
Figure 6 is an enlarged sectional view of the bag and tire in their final relative positions.

In operating the machine a bag is placed between the section 11 and the shoes 9—9, the cross head being out the full length of its stroke and the pressure within the bag having been previously reduced to substantially that of the atmosphere. The hand control 7 is then operated by the workmen to admit compressed fluid to the motor to carry the cross head to its other extreme position as shown in Fig. 4. The sections 11 and 12—12 are substantially of the shape of the fold to be made and in the initial movement of the cross head these sections engage the part to be folded and reverse its curvature to approximately the shape of the folding sections as shown in Figs. 4 and 5. When the cross head has about reached the limit of its folding movement the free end of the bell crank 15 strikes the trip 16 whereupon the latch 14 is withdrawn from the post 13 leaving the post and section 11 free to drop as shown in Fig. 4. This provides a free space between the fold and the section 11 for the insertion of the arm of the workman in a convenient manner to remove the folded bag from the machine. The bag having been removed it is then inserted in the tire as shown in Fig. 5 and then the folded section permitted to recoil or unfold to assume its proper position within the tire. The casing may then be placed in the mold and the bag inflated to the required pressure in the usual way. When the bag has been removed from the machine the lever 7 is released thereby permitting the spring 8 to reverse the action of the motor which returns the cross head to its original position. In returning to this position the post 13 is first arrested by striking the abutment 17 and the further movement of the cross head brings the latch 14 into engagement with the notch in post 13 thereby locking the two together ready for another operation.

As many apparently widely different embodiments of this invention may be made without departing from the spirit thereof, it is to be understood that I do not intend to limit myself to the specific form of the invention as set forth except as indicated in the appended claims.

Having thus described my invention, what I claim and desire to protect by Letters Patent is:—

1. A machine for folding ring-shaped bags used in the manufacture of tires comprising means for engaging a bag at the part to be folded of substantially the shape of the fold to be formed, and means for operating said engaging means whereby the curvature of the said part is reversed and conformed to substantially the shape of the engaging means 2. A machine for folding ring-shaped bags used in the manufacture of tires comprising sectional means for engaging a bag at the part to be folded of substantially the shape of the fold to be formed, means for operating said engaging means whereby the curvature of the said part is reversed and conformed to substantially the shape of the engaging means, and means for permitting the sections to move relatively.

3. A machine for folding ring-shaped bags in the manufacture of tires comprising sectional means for engaging a bag at the part to be folded of substantially the shape of the fold to be formed, means for operating said engaging means whereby the curvature of the said part is reversed and conformed to substantially the shape of the engaging means, and means for permitting a section to move away from the folded bag.

4. A machine for folding ring-shaped bags in the manufacture of tires comprising sectional means for engaging a bag at the part to be folded of substantially the shape of the fold to be formed, means for operating said engaging means whereby the curvature of the said part is reversed and conformed to substantially the shape of the engaging means, means for releasing a section to permit it to move away from the folded bag, and means for returning the section to its original position after the bag has been removed.

5. A machine for folding ring-shaped bags used in the manufacture of tires comprising means composed of a plurality of sections for engaging a bag at the part to be folded, means for operating the first mentioned means to fold the bag, and means permitting relative movement of the sections of the first mentioned means Signed at Detroit, county of Wayne, and State of Michigan, this 15th day of October, 1923.

ADRIAN O. ABBOTT, Jr.